(12) United States Patent
Lu et al.

(10) Patent No.: US 11,774,367 B1
(45) Date of Patent: Oct. 3, 2023

(54) RAMAN DETECTION SYSTEM, DETECTION METHOD AND APPLICATION THEREOF

(71) Applicant: City University of Hong Kong Shenzhen Futian Research Institute, Guangdong (CN)

(72) Inventors: Jian Lu, Guangdong (CN); Binbin Zhou, Guangdong (CN); Junda Shen, Guangdong (CN); Zebiao Li, Guangdong (CN); Yangyang Li, Guangdong (CN)

(73) Assignee: City University of Hong Kong Shenzhen Futian Research Institute, Guangdong (CN)

( * ) Notice: Subject to any disclaimer, the term of this patent is extended or adjusted under 35 U.S.C. 154(b) by 0 days.

(21) Appl. No.: 17/936,563

(22) Filed: Sep. 29, 2022

(30) Foreign Application Priority Data

Aug. 3, 2022 (CN) .......................... 202210929222.6

(51) Int. Cl.
*G01N 21/65* (2006.01)
(52) U.S. Cl.
CPC .................................. *G01N 21/658* (2013.01)
(58) Field of Classification Search
None
See application file for complete search history.

(56) References Cited

FOREIGN PATENT DOCUMENTS

CN 111175279 A * 5/2020

OTHER PUBLICATIONS

4. Gupta, Shilpi, et al. "Portable Raman leaf-clip sensor for rapid detection of plant stress." Scientific Reports 10.1 (2020): 20206 (Year: 2020).*
7. Basu, Srismrita, et al. "Single fiber surface enhanced Raman scattering probe." Journal of Vacuum Science & Technology B 35.6 (2017) teaches a needle probe that performs SERS measurements (see Fig. 10) (Year: 2017).*

* cited by examiner

*Primary Examiner* — Tarifur R Chowdhury
*Assistant Examiner* — Roberto Fabian, Jr.
(74) *Attorney, Agent, or Firm* — NKL Law; Allen Xue

(57) ABSTRACT

A Raman detection system has a Raman spectrometer and a fixing light shielding stand. One end of the fixing light shielding stand is fixedly connected to the Raman spectrometer, and the other end is disposed with an entrance groove for a needle-like SERS probe to enter. A slot for fixing the needle-like SERS probe is formed at an end of the entrance groove, and the slot and the needle-like SERS probe match in shape and size. The Raman detection system has a fixing light shielding device with a dark color groove and a focal length. The groove can be used for limiting the rolling of the curved surface structure of the needle-like SERS probe. A laser can be focused on the curved surface more accurately by adjusting the distance from the instrument detector to the SERS probe.

10 Claims, 6 Drawing Sheets

RAMAN DETECTION SYSTEM, DETECTION METHOD AND APPLICATION THEREOF

TECHNICAL FIELD

The present disclosure belongs to the field of detection technology and relates to a Raman detection system, a detection method and application thereof, in particular to a high-performance portable Raman detection system, a detection method and application thereof.

BACKGROUND

In recent years, Raman spectroscopy is widely applied to various fields such as food safety, pharmaceutical engineering, customs inspection and the like due to its characteristics such as being easy to carry out, being non-invasive testing, and the like, and has become the most potential Point of Care Testing (POCT). However, the portable Raman instrument generally has low sensitivity and is difficult to be used for detecting trace substances in complex systems, putting a limit on the wider application of Raman technology. Researchers have found that a noble metal with nanoscale rough surfaces (called "SERS probe") could enhance the Raman spectrum signals by one million times, and this has greatly promoted the application of the portable Raman instrument in various fields. Currently a most key problem is how to match a high-performance SERS probe with a portable Raman instrument to form a high-performance portable Raman detection system.

Existing SERS probes mostly have planar substrates that are modified by nano-particles of noble metal. In such probes, glass, silicon wafers, aluminum foil and the like are usually needed as substrates, and items to be tested are dripped on their surfaces for detection. In practical detection, there are numerous problems with the planar substrates: (1) information about the interiors of bulk samples, for example, a series of meat products (such as fish, beef, etc.) cannot be obtained; (2) background interference signals in the item to be tested will also be adsorbed onto the chip surface together with the target substances in a drop-wise manner and interfere with final detection; (3) the planar substrates themselves also have signals; for example, the most frequently used silicon wafer shows a significant Raman peak at around 520 $cm^{-1}$; all these signals can bring interference to the detection.

In view of the problems described above, a needle-like SERS probe has been developed at present. It can be directly inserted into a bulk item for detection, and can selectively adsorb target substance molecules, thereby eliminating the interference from the background signals. However, all the fixing devices related to the SERS (surface enhanced Raman scattering) detection process currently available on the market are developed based on the planar SERS probe, and these fixing devices are usually designed according to the scale and height of the planar SERS probe and cannot meet the usage scenarios of the needle-like SERS probes. Therefore, it is necessary to develop a Raman detection system for the fixation and detection process involving the needle-like SERS probe.

SUMMARY

The present disclosure aims to provide a Raman detection system, a detection method and application thereof, which is applied to the detection process involving a needle-like SERS probe and has excellent detection performance.

In order to achieve the object described above, according to one aspect of the present disclosure, a Raman detection system is provided. The system comprises a Raman spectrometer and a fixing light shielding stand; one end of the fixing light shielding stand is fixedly connected to the Raman spectrometer, and the other end is disposed with an entrance groove for a needle-like surface enhanced Raman scattering (SERS) probe to enter; a slot for fixing the needle-like SERS probe is formed at an end of the entrance groove, and the slot and the needle-like SERS probe match in shape and size.

According to one embodiment of the present disclosure, the system is a portable Raman detection system with excellent performance.

According to one embodiment of the present disclosure, the entrance groove is a long and narrow deep groove structure formed by cutting from a side of the fixing light shielding stand and extending toward a center.

According to one embodiment of the present disclosure, the slot is formed at an end of the entrance groove and extends toward one side along the end.

According to one embodiment of the present disclosure, the slot is perpendicular to an extending direction of the entrance groove, forming a U-shaped groove structure, and the slot and the entrance groove form an L shape together.

According to one embodiment of the present disclosure, one end of the fixing light shielding stand is disposed with a mounting hole for accommodating and fixing a detector of the Raman spectrometer, and the mounting hole and the detector match in shape and size.

According to one embodiment of the present disclosure, an inner measuring platform is disposed within the mounting hole. The inner measuring platform is formed by protruding and extending from a periphery side of an inner wall of the mounting hole to a central position, and is at a certain distance from an upper opening of the mounting hole. A cavity below the inner measuring platform has a cross-sectional dimension which is smaller than that of a cavity above the inner measuring platform so that the detector is fixed in a vertical direction.

According to one embodiment of the present disclosure, a distance between an upper end surface of the inner measuring platform and the slot is L, and 1 mm≤L≤100 mm; preferably, 3 mm≤L≤20 mm.

According to one embodiment of the present disclosure, a latch-type fixed structure is formed at one end of the fixing light shielding stand. The latch-type fixed structure is provided with a semicircular groove located in a central position. Two fixing surfaces are formed by extending from an opening end toward both sides along a diameter direction. End portions of the two fixing surfaces extend along a vertical direction at both sides below the semicircular groove to form two limiting blocks. Arc-shaped clamping grooves are formed on opposite inner sides of the two limiting blocks.

The semicircular groove and the two opposite arc-shaped clamping grooves form a cavity for accommodating the detector of the Raman spectrometer.

According to one embodiment of the present disclosure, the fixing light shielding stand is a cylindrical structure.

According to one embodiment of the present disclosure, the fixing light shielding stand is a housing made of dark color plastic.

According to another aspect of the present disclosure, there is also provided a detection method based on the Raman detection system, the method comprising the following steps:

1) inserting the detector of the Raman spectrometer into the mounting hole or the semicircular groove of the fixing light shielding stand;
2) inserting the needle-like SERS probe into a sample to be tested;
3) pulling out the needle-like SERS probe and inserting the needle-like SERS probe into the slot of the fixing light shielding stand; and
4) Performing spectral acquisition with the Raman spectrometer.

The present disclosure also provides the application of the Raman detection system described above in the field of needle-like SERS probe detection, especially application to detection in meat products and biological samples.

Beneficial Effects of Present Disclosure:

1) The Raman detection system of the present disclosure is a high-performance portable Raman detection system developed based on a needle-like SERS probe, and can be a fixing light shielding device with designs of a dark or black color groove and a focal length, wherein the dark or black color has a better light shielding effect, the groove can be used for limiting the rolling of a curved surface structure of the needle-like SERS probe and for the probe to be conveniently inserted in, and a laser can be focused on the curved surface more accurately by adjusting the focal length.
2) Conventional planar probes are usually large in size, and their matching detection devices are also large in size. In contrast, the matching detection device needed by the needle-like SERS probe of the present disclosure can be more portable, favoring user operation and use. It is not only an effective complement to the conventional SERS detection field, but also can expand the application of the SERS technology to include detection in more complex systems (such as meat products, biological samples and the like) so that the SERS technology has wider application.

BRIEF DESCRIPTION OF THE ATTACHED DRAWINGS

Figure 1:
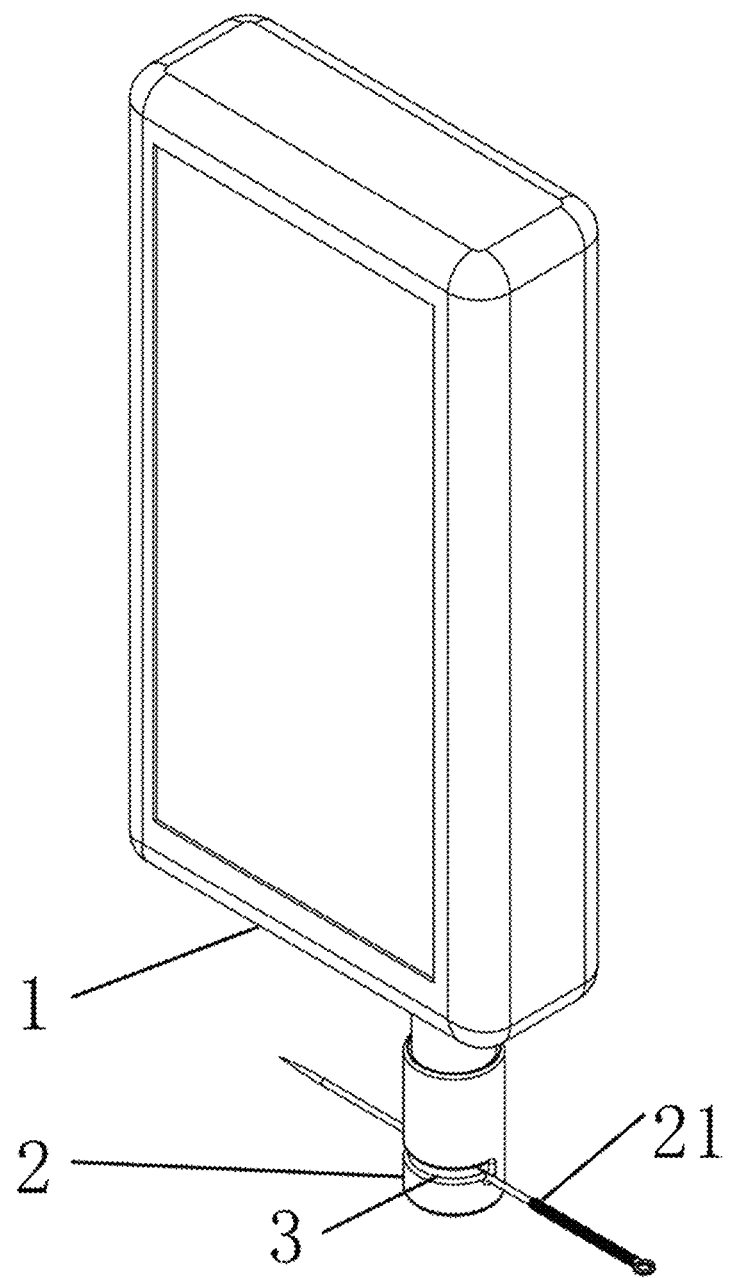
FIG. 1 is a schematic structural diagram of a needle-like SERS probe being fixed by a fixing light shielding stand for detection according to an embodiment of the present disclosure.

Attachment marks: 1. Raman spectrometer; 2. fixing light shielding stand; 21. needle-like SERS probe; 3. entrance groove; 4. slot; 5. mounting hole; 6. inner measuring platform; 7. latch-type fixed structure; 71. circular groove; 72. fixing surface; 73. limiting block; 74. arc-shaped clamping groove.

DETAILED DESCRIPTION

The present disclosure will be illustrated in further detail by the following description of specific embodiments. It should be understood that the following embodiments are merely exemplary illustration and explanation of the present disclosure, and should not be construed as limiting the protection scope of the present disclosure. All techniques implemented based on the content of the present disclosure described above are encompassed within the protection scope of the present disclosure.

Given that a needle-like SERS probe is different from a planar probe in that the curved surface structure thereof is prone to rolling and thus it needs to be fixed by an additional design, and that the detectable region of the needle-like SERS probe is longer, thinner and non-planar and thus a higher requirement is imposed on focusing, the present disclosure provides a Raman detection system which is applicable to the detection process involving a needle-like SERS probe.

As shown in FIGS. 1-5, the Raman detection system comprises a Raman spectrometer 1 and a fixing light shielding stand 2; one end of the fixing light shielding stand 2 is fixedly connected to a detector of the Raman spectrometer 1, and the other end is disposed with an entrance groove 3 for a needle-like SERS probe 21 to be inserted in; a slot 4 for fixing the needle-like SERS probe is formed at an end of the entrance groove 3, and the slot 4 and the needle-like SERS probe 21 match in shape and size.

In one specific embodiment of the present disclosure, as shown in FIG. 1, a mounting hole 5 is provided at one end of the fixing light shielding stand 2 to accommodate and fix the detector of the Raman spectrometer 1, and a cavity in the mounting hole 5 and the detector of the Raman spectrometer 1 match in shape and size; the shape and size of an entrance opening for the detector of the Raman spectrometer at the upper end of the fixing light shielding stand 2 can be designed according to different Raman spectrometer devices.

Figure 2:
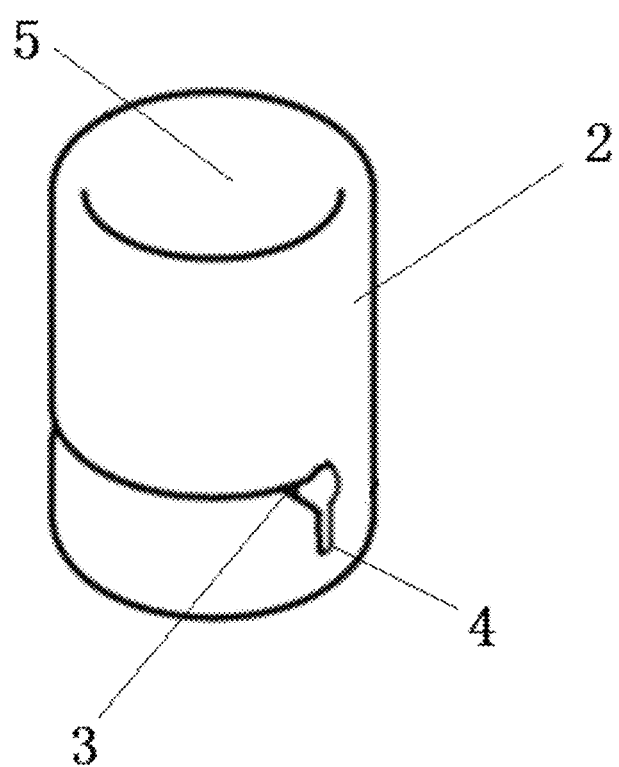
FIG. 2 is a schematic structural diagram of the fixing light shielding stand employed in FIG. 1.
Figure 3:
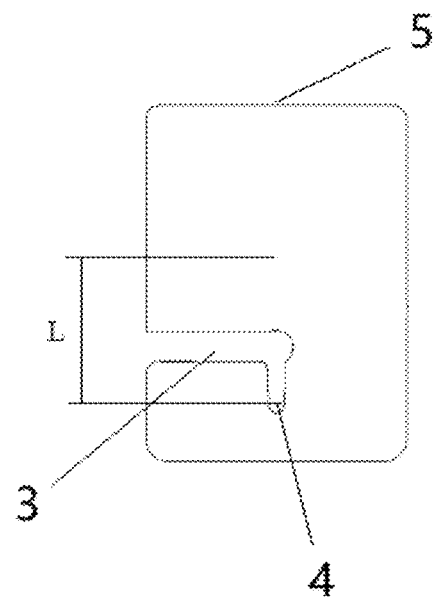
FIG. 3 is a front view of the fixing light shielding stand employed in FIG. 1.

As shown in FIGS. 1-3, the entrance groove 3 is a groove structure formed by cutting from a side of the fixing light shielding stand 2 and extending toward a center, an end of the entrance groove 3 is an arc-shaped structure, and the slot 4 is formed at the end of the entrance groove 3 and extends toward one side.

Preferably, the slot 4 is formed at the end of the entrance groove 3 and is perpendicular to an extending direction of the entrance groove 3, forming a U-shaped groove structure. After entering from the entrance groove 3, the needle-like SERS probe 21 is fixed within the slot 4. The size of the slot 4 is designed based on the needle-like SERS probe 21, and the position of the slot 4 can be designed based on the focal lengths of different Raman detector in a coordinated manner.

When in use, the detector of the Raman spectrometer 1 is fixed within the mounting hole 5 of the fixing light shielding stand 2, so that the two are fixedly connected. The needle-like SERS probe 21 slides into the slot 4 of the fixing light shielding stand 2 through the entrance groove 3. During testing, the needle-like SERS probe 21 is perpendicular to the optical path of the laser emitted by the Raman spectrometer and at an optimal focal length for the laser, so an optimal signal intensity is obtained.

As shown in FIG. 3, an inner measuring platform 6 is also disposed within the mounting hole 5; the inner measuring platform 6 is formed by extending from a periphery side of an inner wall of the mounting hole to a central position, and is at a certain distance from an upper opening of the mounting hole 5; a cavity of the mounting hole 5 below the inner measuring platform 6 has a cross-sectional dimension which is smaller than that of a cavity above the inner measuring platform 6 so that the detector is clamped in a vertical direction and fixed to a position that allows the detector to be kept at a proper distance. A distance between an end surface of the inner measuring platform 6 and the slot 4 is L. L is a distance from the instrument detector to the SERS probe. Laser can be focused on a curved surface more accurately by adjusting the distance from the instrument detector to the SERS probe. The structure described above ensures that the fixing light shielding stand 2 can effectively keep a laser spot on the needle-like SERS probe when in use.

The laser focal lengths of different Raman spectrometers 1 can be designed and adjusted to ensure that laser spots of the Raman devices can be correctly focused on the surface of the needle-like SERS probe 21 so as to obtain an optimal enhanced signal. Preferably, 1 mm≤L≤100 mm; further preferably, 3 mm≤L≤20 mm.

Figure 4:
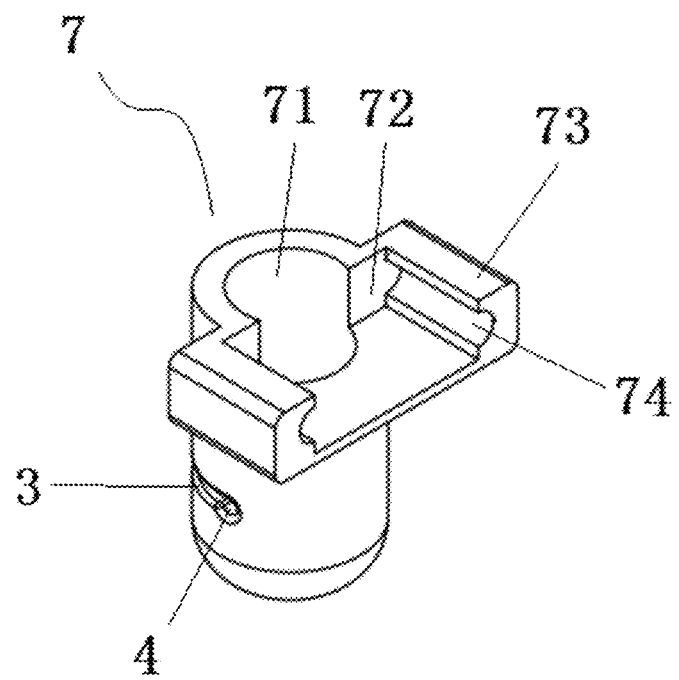
FIG. 4 is a schematic structural diagram of a fixing light shielding stand according to another embodiment of the present disclosure.
Figure 5:
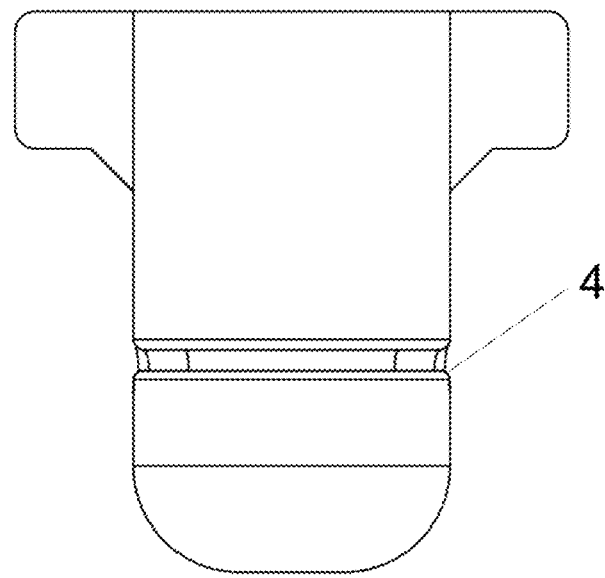
FIG. 5 is a front view of the fixing light shielding stand of the structure in FIG. 4.

In another specific embodiment of the present disclosure, as shown in FIGS. 4-5, a latch-type fixed structure 7 is formed at one end of the fixing light shielding stand 2; the latch-type fixed structure 7 is provided with a semicircular groove 71 located in a central position; two fixing surfaces 72 are formed by extending from an opening end toward both sides along a diameter direction; end portions of the two fixing surfaces 72 extend along a direction perpendicular to the fixing surfaces at both sides below the semicircular groove 71 to form two limiting blocks 73; arc-shaped clamping grooves 74 are formed on opposite inner sides of the two limiting blocks 73; the semicircular groove 71 and the two opposite arc-shaped clamping grooves 74 form a cavity for accommodating and fixing the detector of the Raman spectrometer 1.

After a linear or needle-like SERS probe enters the slot 4, the laser position of the Raman spectrometer 1 is ensured under the combined action of the two limiting blocks 73 and the two fixing surfaces 72. L is the corresponding focal length of the Raman device and can be designed and adjusted according to the laser focal lengths of different Raman devices. The structure described above ensures that the laser spot is correctly focused on the surface of the needle-like SERS probe 21 in the fixing light shielding stand 2 during testing, so that an optimal signal enhancement effect is obtained.

Figure 6:
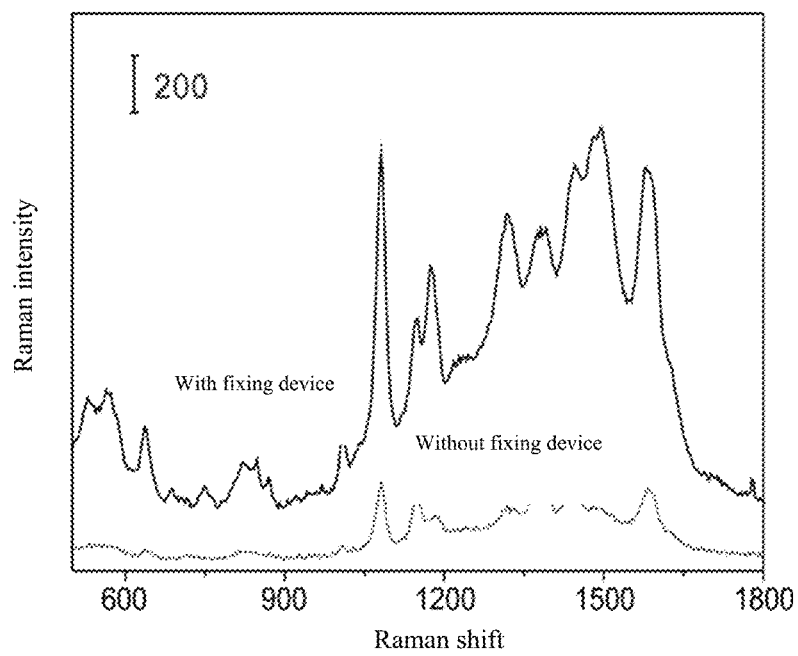
FIG. 6 is a comparative schematic diagram showing the spectra obtained by using a needle-like SERS probe fixed by the fixing light shielding stand of the present disclosure and a needle-like SERS probe not fixed by a fixing device.

The fixing light shielding stand 2 is mainly used for fixing and controlling the needle-like SERS probe to a position that favors focusing and detection by the Raman spectrometer. The SERS spectrum is significantly enhanced with the fixing light shielding stand 2 (see FIG. 6).

Figure 7:
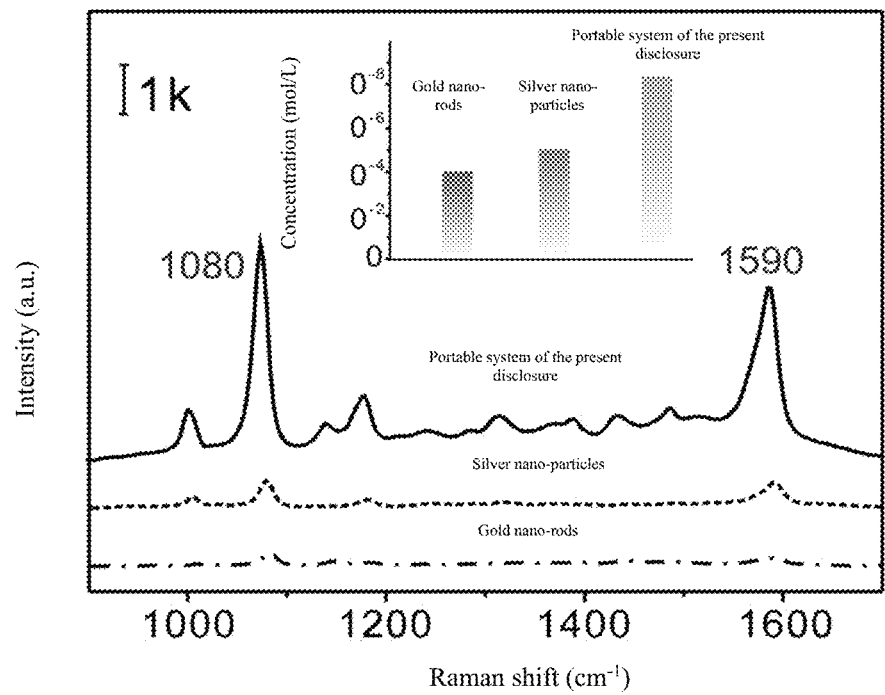
FIG. 7 is a comparative schematic diagram showing the results obtained by using the Raman detection system of the present disclosure with existing gold nano-rods and silver nano-particles as SERS probes to detect aminothiophenol.

When applied to a detection process involving the needle-like SERS probe, the Raman detection system of the present disclosure has a better detection performance than the detection systems developed based on the planar probe currently available on the market. By way of comparison, the Raman detection system of the present disclosure is used with the currently commonly used gold nano-rods and silver nano-particles as SERS probes to detect the frequently detected substance aminothiophenol. As can be seen from FIG. 7, in contrast to the common Raman detection systems in which gold nano-rods and silver nano-particles are used as SERS probes, the Raman detection system of the present disclosure has more significant signals, and the limit of detection for aminothiophenol can reach 10-8 M, which is higher than those of the previous systems by 1-3 orders of magnitude.

Figure 8:
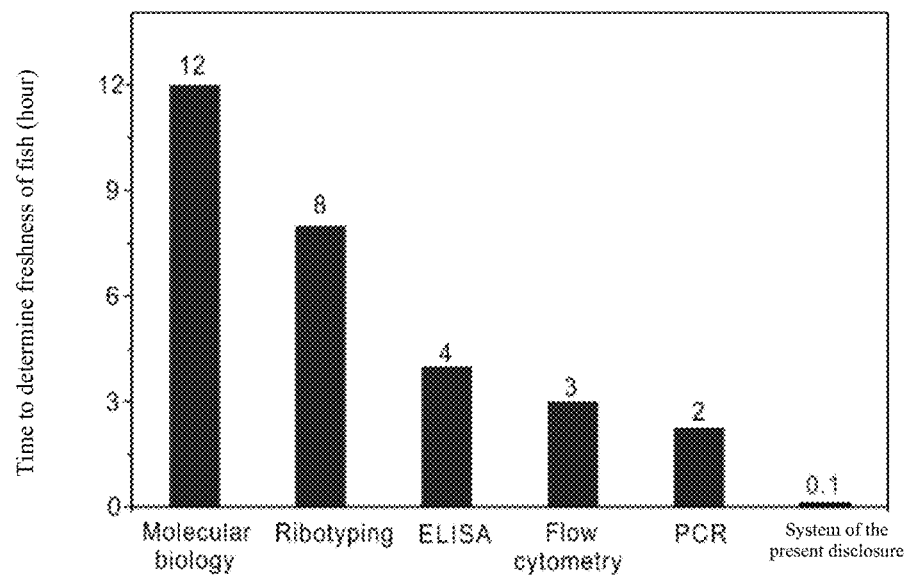
FIG. 8 is a comparative schematic diagram showing the time spent on determination of freshness of fish by the Raman detection system of the present disclosure and Raman detection systems currently commonly used in molecular biology, ribotyping, ELISA, flow cytometry and PCR.

The Raman detection system of the present disclosure has a unique fixing light shielding stand structure capable of fixing the needle-like SERS probe and can be used for detecting internal signals of fish and various meat products, thereby eliminating the pretreatment process and reducing the detection time from more than ten minutes to less than 3 minutes. As shown in FIG. 8, systems such as those currently commonly used in molecular biology, ribotyping, ELISA, flow cytometry and PCR take several hours to complete the measurement, while the Raman detection system of the present disclosure takes only 6 minutes.

The shape of the fixing light shielding stand 2 is not particularly limited as long as the requirement can be met, and preferably the fixing light shielding stand 2 is a cylindrical structure. The fixing light shielding stand 2 can be manufactured using a mold by injection molding or additive manufactured by 3D printing.

Figure 9:
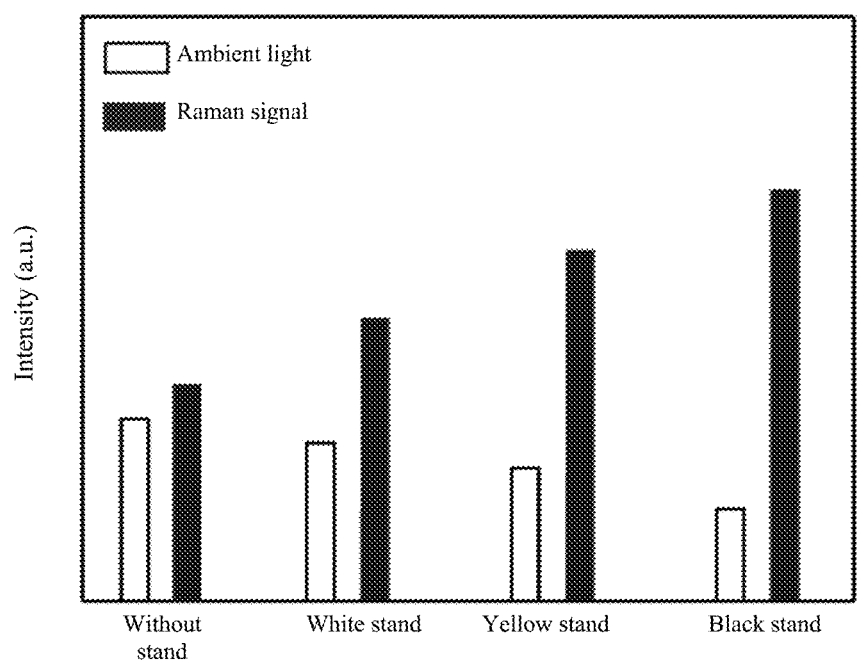
FIG. 9 is a comparative schematic diagram showing the signal intensities obtained by using fixing light shielding stands with different colors in testing.

In addition to fixing the needle-like SERS probe, the fixing light shielding stand 2 functions to protect from light, eliminate the influence of ambient light on detection and so on. One preferred fixing light shielding stand 2 is a housing made of dark color plastic. As can be seen from FIG. 9, the fixing light shielding stands with different colors have different shielding effects on ambient light; those of darker colors achieve better light shielding effects on ambient light, and dark color materials can improve the shielding effect; in particular, the black color material produces the best shielding effect on ambient light and is more helpful in enhancing Raman signals.

The present disclosure also provides a Raman detection method for a needle-like SERS probe in which the Raman detection system described above is applied.

According to one embodiment of the present disclosure, the method specifically comprises the following steps:

1) inserting the detector of the Raman spectrometer into the mounting hole or the semicircular groove of the fixing light shielding stand;
2) inserting the needle-like SERS probe into a sample to be tested;
3) pulling out the needle-like SERS probe and inserting the needle-like SERS probe into the slot of the fixing light shielding stand; and
4) recording a spectrum with the Raman spectrometer.

The technical schemes of the present disclosure are further explained by the following description of examples.

Example 1

1) A fixing light shielding stand shown as the structure in FIGS. 2-3 is fixed to a Raman spectrometer by: inserting a front portion of a detector of the Raman spectrometer into a mounting hole of the fixing light shielding stand;
2) A needle-like SERS probe is inserted into an aquatic product, kept for 3 minutes and then pulled out;

3) The SERS probe is placed in the fixing light shielding stand and maintained movable in a horizontal direction (so that spectral signals at different points on the needle-like SERS probe can be conveniently recorded) by using a slot 4 to fix the needle-like SERS probe to a position that is perpendicular to the Raman spectrometer (that is, the focal length is fixed for a laser); and 4) A spectrum is recorded with the Raman spectrometer, and thus data information in the aquatic product was obtained.

Example 2

1) A fixing light shielding stand of the latch-type fixed structure shown as the structure in FIGS. 4-5 was fixed to a hand-held Raman spectrometer by: inserting a front portion of a detector of the hand-held Raman spectrometer into a corresponding semicircular groove of the fixing light shielding stand, with the detector fixed and maintained at a proper distance by two fixing surfaces and two arc-shaped clamping grooves;

2) A needle-like SERS probe is inserted into a meat product, kept for 3 minutes and then pulled out;

3) The needle-like SERS probe is placed in the fixing light shielding stand and maintained movable in a horizontal direction (so that spectral signals at different points on the probe can be conveniently recorded) by using a slot to fix the needle-like SERS probe to a position that is perpendicular to the Raman spectrometer (that is, the focal length is fixed for a laser); and 4) A spectrum is recorded with the hand-held Raman spectrometer, and thus data information in the aquatic product was obtained.

The embodiments of the present disclosure have been described above. However, the present disclosure is not limited thereto. Any modification, equivalent, improvement and the like made without departing from the spirit and principle of the present disclosure shall fall within the protection scope of the present disclosure.

The invention claimed is:

1. A Raman detection system, comprising a Raman spectrometer (1) and a fixing light shielding stand (2), wherein one end of the fixing light shielding stand (2) is fixedly connected to the Raman spectrometer (1), and the other end is disposed with an entrance groove (3) for a needle-like surface enhanced Raman scattering (SERS) probe (21) to enter; a slot (4) for placing and fixing the needle-like SERS probe (21) is formed at an end of the entrance groove (3), and the slot (4) and the needle-like SERS probe (21) match in shape and size.

2. The Raman detection system according to claim 1, wherein the entrance groove (3) is a long and narrow deep groove structure formed by cutting from a side of the fixing light shielding stand (2) and extending toward a center.

3. The Raman detection system according to claim 1, wherein the slot (4) is formed at the end of the entrance groove (3) and extends toward one side along the end of the entrance groove.

4. The Raman detection system according to claim 3, wherein the slot (4) is perpendicular to an extending direction of the entrance groove (3), forming a U-shaped groove structure, and the slot (4) and the entrance groove (3) form an L-shape together.

5. The Raman detection system according to claim 1, wherein one end of the fixing light shielding stand (2) is disposed with a mounting hole (5) for accommodating and fixing a detector of the Raman spectrometer (1), and the mounting hole (5) and the detector match in shape and size.

6. The Raman detection system according to claim 5, wherein an inner measurement platform (6) is disposed inside the mounting hole (5); the inner measurement platform (6) is formed by protruding and extending from a periphery side of an inner wall of the mounting hole (5) to a central position and is at a certain distance from an upper opening of the mounting hole (5); a cavity below the inner measuring platform (6) has a cross-sectional dimension which is smaller than that of a cavity above the inner measuring platform (6) so that the detector is fixed in a vertical direction.

7. The Raman detection system according to claim 6, wherein a distance between an upper end surface of the inner measuring platform (6) and the slot (4) is L, and 1 mm≤L≤100 mm.

8. The Raman detection system according to claim 5, wherein a latch-type fixed structure (7) is formed at one end of the fixing light shielding stand (2); the latch-type fixed structure (7) is provided with a semicircular groove (71) located in a central position; two fixing surfaces (72) are formed by extending from an opening end toward both sides along a diameter direction; end portions of the two fixing surfaces (72) extend along a vertical direction at both sides below the semicircular groove (71) to form two limiting blocks (73); arc-shaped clamping grooves (74) are formed on opposite inner sides of the two limiting blocks (73); the semicircular groove (71) and the two opposite arc-shaped clamping grooves (74) form a cavity for accommodating the detector of the Raman spectrometer (1).

9. A detection method based on the Raman detection system according to claim 8, comprising the following steps:
1) inserting the detector of the Raman spectrometer into the mounting hole or the semicircular groove of the fixing light shielding stand;
2) inserting the needle-like SERS probe into a sample to be tested;
3) pulling out the needle-like SERS probe and inserting the needle-like SERS probe into the slot of the fixing light shielding stand; and
4) recording a spectrum with the Raman spectrometer.

10. Application of the Raman detection system according to claim 1 in the field of needle-like SERS probe detection.

* * * * *